United States Patent [19]

Johnson et al.

[11] Patent Number: 5,063,487
[45] Date of Patent: Nov. 5, 1991

[54] MAIN AND AUXILIARY TRANSFORMER RECTIFIER SYSTEM FOR MINIMIZING LINE HARMONICS

[75] Inventors: Leopold J. Johnson, Valley Center; Russell E. Hammond, La Jolla, both of Calif.

[73] Assignee: The United States of America as represented by the Secrectary of the Navy, Washington, D.C.

[21] Appl. No.: 497,387

[22] Filed: Mar. 22, 1990

[51] Int. Cl.[5] ...................... H02M 1/14; H02M 5/14; H02M 7/06

[52] U.S. Cl. ..................................... 363/3; 323/361; 363/126; 363/154

[58] Field of Search ................ 323/361; 336/5; 363/2, 363/3, 5, 7, 126, 153, 154

[56] References Cited

U.S. PATENT DOCUMENTS

| 2,176,210 | 10/1939 | Clough . | |
|---|---|---|---|
| 2,307,527 | 1/1943 | Maslin et al. . | |
| 2,881,383 | 4/1959 | Michaelis . | |
| 3,162,799 | 12/1964 | Roberts . | |
| 3,671,901 | 6/1972 | Lys | 336/5 |
| 3,711,760 | 1/1973 | Kaiser | 321/5 |
| 4,053,820 | 10/1977 | Peterson et al. | 363/44 |
| 4,106,089 | 8/1978 | Fettinger | 363/153 |
| 4,683,527 | 7/1987 | Rosa | 363/5 |
| 4,779,181 | 10/1988 | Traver et al. | 363/154 |

FOREIGN PATENT DOCUMENTS

892622 12/1981 U.S.S.R. .............. 363/126

Primary Examiner—William H. Beha, Jr.
Attorney, Agent, or Firm—Harvey Fendelman; Thomas Glenn Keough; Peter A. Lipovsky

[57] ABSTRACT

A polyphase transformer design is presented in which transformer output phasors are accurately constructed in both voltage magnitude and relative phase angle. The design incorporates both main and auxiliary transformers that are used in unison to produce the accurately constructed phasors. The main transformer permits rough phasor adjustment to be made with the auxiliary transform permitting phasor fine tuning. Such a design is particularly suitable in transformer approaches that require output phases that are of a number not evenly divisible by three.

10 Claims, 6 Drawing Sheets

```
Main Transformer Core Legend:
Core Type:  EI 2.4 3Ø, 4 3/4" Stack
Core Material: 29 Gauge Silicon Iron; M6 Grain Oriented
Core Stack: 395 Laminations, 10.8" by 12"
```

*FIG. 4*

```
Auxiliary Transformer Core Legend:
Core Type:  EI-875 3Ø, 1 Inch Stack
Core Material: 29 Gauge Silicon Iron; M6 Grain Oriented
80 Laminations, 4.15" by 4.375"
```

MAIN AND AUXILIARY TRANSFORMER RECTIFIER SYSTEM FOR MINIMIZING LINE HARMONICS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention pertains broadly to the field of electronics. More particularly, the invention pertains to electrical transformer systems. In still greater particularity, the invention relates to an electrical transformer-rectifier system designed to minimize line harmonics.

2. Description of the Prior Art

It is well-known to those of the transformer art that undesirable harmonic line currents may be generated during a transformer-rectifier process. The rectification of AC power to DC power itself may in general produce these undesirable current harmonics. When harmonic line currents are conducted through a power generation and distribution system that has impedances at these harmonic frequencies, harmonic voltages are created. These harmonic voltages distort line voltage fed to other power system loads, causing possible malfunction of the loads.

Line harmonics may be acceptable in some circumstances but are unacceptable in others. For example, in defense applications, it is common that a myriad of electrical devices be switched on or off a load line at various times and in various combinations. These non-linear loads may cause severe current harmonics to appear in a load line. Such harmonics may not be tolerated by electrical devices, resulting in either a shutdown of the devices or unacceptable powering of the devices. In the latter case some devices may appear to be suitably powered when in reality line power distortions have created fluctuating device operation. In either case the cost of line harmonics may be high.

Because of this the United States Military has imposed Military Standard 1399 upon its electrical designers and contractors. The MIL STD 1399 sets power supply voltage harmonics at 5% with current harmonics being 3% of the fundamental for loads of 1 KVA or more.

Approaches toward reaching these limits may be better understood by an examination of prior attempts to do so.

For a typical three-phase AC to DC transformer-rectifier system it is common that a three-phase bridge rectifier utilize a diode pair for each input phase. The rectifier circuit "picks off" the three-phase incoming current at its peaks producing a "spiked" load current rich in line harmonics and far in frequency from the original sinusoidal current present before the rectification process.

In general, these line harmonics have been removed to a degree through the use of filters. However these filters may be substantial in number and because of their size, weight and complexities their cost may be high.

To do without filters and yet provide a transformer-rectifier system that approaches low voltage and current harmonic limitations, multiphase transformer-rectifier systems have been proposed. Some of these systems utilize transformers that convert three-phase input power into output phases that are a multiple of three such as 6, 12 or more transformation phases so that a greater number of "samples" from the original line input will be drawn.

In spite of some success, multiphase transformer-rectifier systems such as these have generally been unable to meet the rigid voltage and current harmonic limitations imposed by MIL STD 1399.

This lack of success may be attributed in part to a per cycle repetition that occurs in the rectified output waveform of the multiple-of-three phase transformers. This repetition can be avoided in part by constructing a transformer of a prime number of output phases, however prior art transformer construction techniques do not readily lend themselves to the development of such prime-numbered transformer designs.

This is due in part to the relatively more complicated phasor construction process that must take place to create relatively equal prime number output phases. In those prior art transformers that convert an input waveform of three phases into an output waveform that is a multiple of three, such as 6, 12, 15 etc., complete or whole number primary and secondary windings may be readily utilized to perform the necessary phasor construction process.

In a prime number transformer, such whole number windings may lead to the construction of phasors that do not well match each other in voltage magnitude and relative phase angle.

Some attempts at providing more accurate phasor construction have included the "tapping" of windings at an appropriate location so as to produce the necessary fractional voltage magnitude desired to construct an accurate output phasor. While perhaps this has been done successfully, the complexity of this process can be envisioned.

In such a process, it is necessary to first locate the precise winding interconnect point from amongst a multitude of winding turns and then it is necessary that a connection be made that does not conduct with adjacent windings. Again, though success has apparently been achieved utilizing this technique, the need for a less complex phasor construction process exists.

SUMMARY OF THE INVENTION

This invention provides a prime number polyphase transformer and rectifier system for converting a plurality of input phases into an even greater number of output phases. The transformer-rectifier system is designed to draw current from each of the input phases not just at their peaks but also during portions of their cycle when their current magnitudes are less.

The phasor voltages of the polyphase transformer are constructed very accurately by utilizing a main and auxiliary transformer couple. The main transformer is used as a rough adjustment of an input phase with the auxiliary transformer providing additional fine tuning of phasor magnitude when necessary. By utilizing both main and auxiliary transformers, fractional adjustments in phasor magnitude may easily be obtained by altering the appropriate number of windings on either or both transformers. By this process the voltage magnitude of each constructed phasor can be made highly accurate and each constructed phasor can be added vectorially to phasors constructed from the other input phases so that transformer output phasors of desired voltage magnitude and relative phase angle may be accurately constructed.

OBJECTS OF THE INVENTION

It is an object of the invention to provide an improved polyphase transformer.

Another object of the invention is to provide an improved polyphase transformer that permits transformer phasors to be accurately adjusted in both voltage magnitude and phase angle.

Still another object of the invention is to provide a polyphase transformer of improved efficiency.

Yet a further object of the invention is to provide an improved transformer-rectifier system.

Another object of the invention is to provide an improved polyphase transformer-rectifier system for converting AC to DC with minimal harmonic line distortions.

Other objects, advantages and new features of the invention will become apparent from the following detailed description of the invention when considered in conjunction with the accompanied drawings.

DESCRIPTION OF THE PREFERRED EMBODIMENT

Throughout this description original numeric, alphabetic and alphanumeric identifiers have been left largely intact so as to not alter the familiarity of these terms to those skilled in the transformer art. To avoid confusion of these identifiers with other elements of the invention, the other elements of the invention will be identified beginning with the numeral 50 on.

Figure 1:
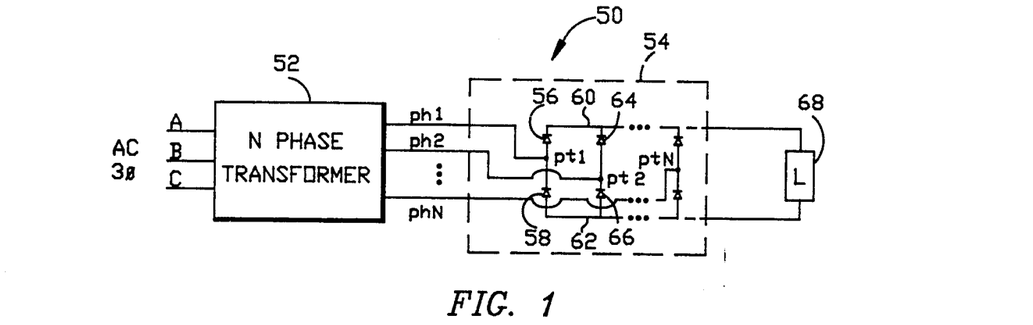
FIG. 1 is a diagrammatic representation of a polyphase transformer and rectifier network according to the invention.

In FIG. 1 a representative embodiment of a polyphase transformer-rectifier system 50 is shown. A generator, not shown, provides three-phase alternating current through points A, B and C to an N-phase transformer 52 of the invention. Transformer 52 develops a number of output phases shown here as ph1, ph2 ... phN with these output phases being fed to a rectifier bridge network 54.

In a well-understood manner each of the output phases is passed through a corresponding pair of rectifier elements. For example, phase 1 (ph1) is passed to point 1 of rectifier network 54, point 1 being designated pt1. Electrically coupled adjacent to pt1 is a diode pair made up of diodes 56 and 58. Through conductors 60 and 62, these diodes are coupled to adjacent diodes 64 and 66, corresponding to pt2, and further to other diodes at other corresponding points in a manner for each phase and each point up to N number of phases. Flow of current from transformer 52 is from the most positively biased of diodes 56, 64, etc., and the most negatively biased of diodes 58, 66, etc. The direct current from rectifier network 54 may be provided to a load 68.

In the specific embodiment of the invention used here for representative purposes prime power is generated and distributed as 440-volt, 60-Hz three $\phi$ power presented through points A, B and C to phase transformer 52. This is then converted to an output of 155 volts DC. In this particular embodiment of the invention, phase transformer 52 has 19 output phases.

As touched upon previously, if the number of output phases of a transformer is divisible by three or even a whole number besides one and the actual number of output phases, a cyclical repetition in the rectified transformer output can occur during one cycle of transformation. As this repetition enhances line current harmonics it is considered undesirable.

In order to minimize these line harmonics, a prime number of transformer output phases has been chosen. As prime numbers are by definition divisible only by themselves and one, the rectified output waveform of a prime number transformer will only repeat itself after one complete cycle of transformation occurs.

To further minimize line harmonics from the transformer and to enhance a smooth AC line current, it is desirable that for a single cycle of transformation a number of samples of the phases of the incoming waveform be taken. As a matter of construction and cost economy, the transformer of the invention was chosen and designed to provide 19 output phases. By selecting 19 output phases, a number of lower order harmonics are minimized.

It is to be understood though that the method used to construct the transformer to be described can with slight modification be used for transformers of any desired number of output phases, prime and non-prime numbers included.

In the particular embodiment of the invention described, the 19-phase transformer 52 of the invention is coupled to multiphase bridge rectifier network 54. Conductor 60 forms a bus by linking diode 56, diode 64 and seventeen other diodes corresponding to each phase output from transformer 52. In like manner conductor 62 forms a bus by joining diodes 58, 66 and seventeen other diodes for each of the corresponding transformer output phases. The diodes are then operably coupled into the bridge network shown so that a pair of diodes, one from each conductor bus, corresponds to each of the transformer output phases.

Figure 2:
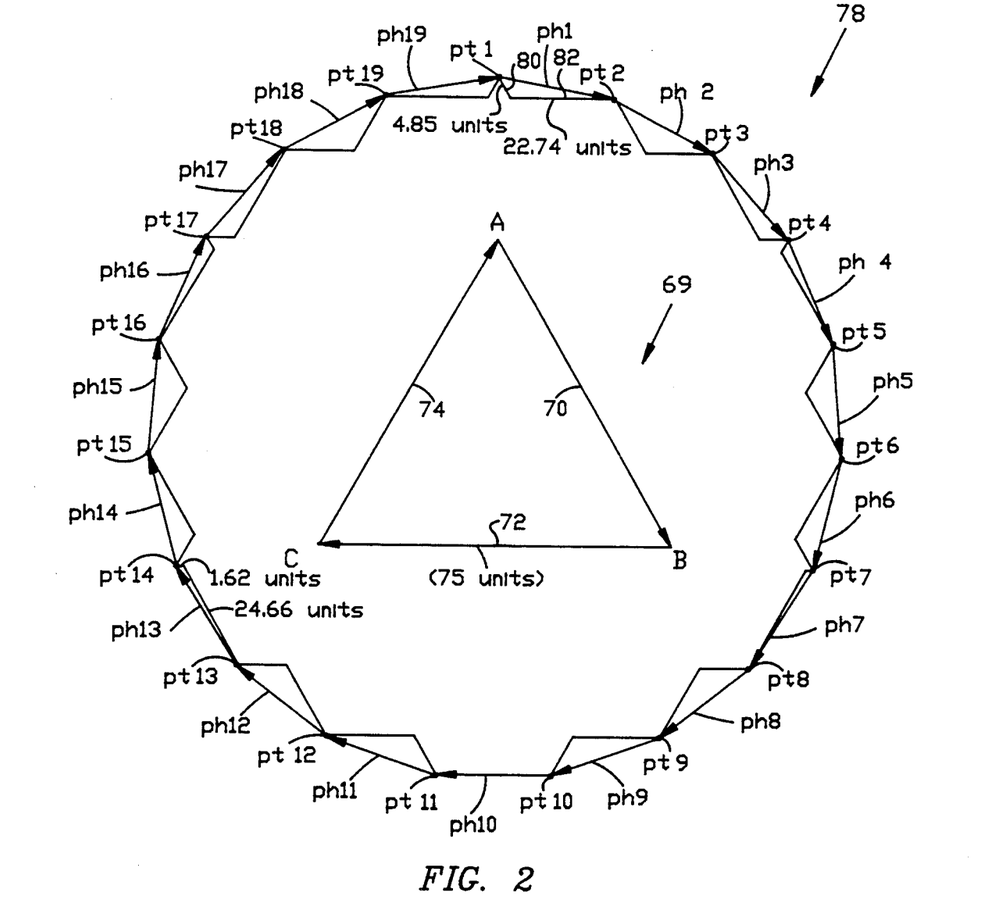
FIG. 2 depicts voltage phasor construction as may be done with a representative embodiment of the invention.

In FIG. 2 a voltage phasor construction diagram is shown. The equilateral triangle 69 in the center of FIG. 2 is used to depict a three-phase input waveform such as that applied to transformer 52. This input waveform is made up of three voltages 120 degrees apart. Phasor 70 represents the magnitude and direction of one of these voltages in an A to B direction (A-B). Similarly, phasor 72 represents the magnitude and direction of a second of these voltages depicted as progressing from B to C (B-C). The third of these voltages is represented by the magnitude and direction of phasor 74 (C-A).

Ring 78, surrounding the input phasors, represents one complete cycle of transformer 52. Points 1 through 19, shown as pt1 through pt19, lie along the periphery of this ring and represent electrical coupling points within transformer 52 and are also one and the same as pt1, pt2 . . . ptN within rectifier network 54.

As will be understood by those skilled in the art, the somewhat circular shape of periphery 78 may be constructed by dividing a circle into an equal number of sectors equivalent in number to the number of desired transformer output phasors. Where adjacent sectors intersect the periphery of the circle, phasors of the transformer must be constructed to originate and end.

As those in the art know, construction of these transformer phasors is done by altering the input phasors of the original three-phase waveform input into the transformer. Though the precise construction of the phasors according to the invention will be discussed in greater detail, a brief general overview of the phasor construction process will be discussed to familiarize the reader with the mechanics of this process.

For example, phasor 1 designated as ph1 should be constructed of a magnitude and direction that is sufficient to pass from pt1 to pt2 of ring 78. Input phasors 70 and 72 are used for this and are altered in magnitude so as to construct the resultant transformer output phasor ph1. One such path for ph1 includes phasor 80 made up of one or more output phasors adjusted from input phasor 70 and phasor 82 made up of one or more output phasors adjusted from input phasor 72.

In some cases in the past, precise adjustment of an input waveform so as to produce adjusted output phasors of precise magnitude and direction has been difficult. As discussed, success has been achieved in transforming input waveforms of three phases into output phases of waveforms of multiple three phases, but these designs do not readily lend themselves to the accurate construction necessary for transformers in which output phases are not an even multiple of three.

Figure 3:
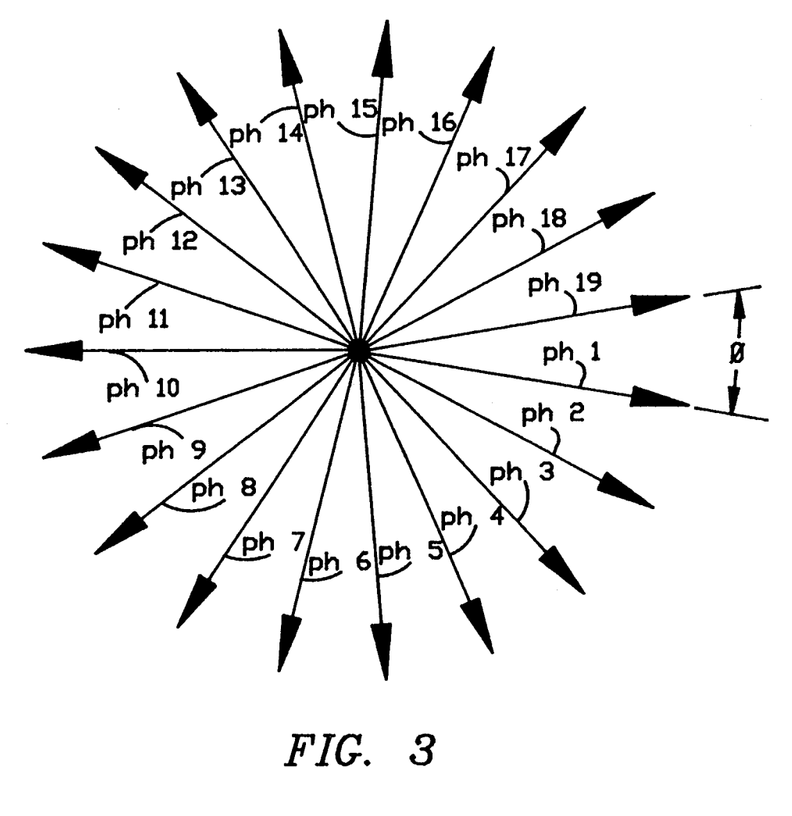
FIG. 3 depicts output phases adjusted according to a representative model of the invention with the adjusted output phasors graphically transferred to a common point of origin to illustrate the correspondence of phase magnitude and relative phase angle amongst these adjusted output phasors.

In FIG. 3 an enlarged phaser diagram has been constructed from the adjusted output phasors ph1 through ph19 of FIG. 2 in order to generally illustrate the uniformity of magnitude and relative phase angle $\phi$ made possible by the polyphase transformer-rectifier system of the invention.

Figure 4:
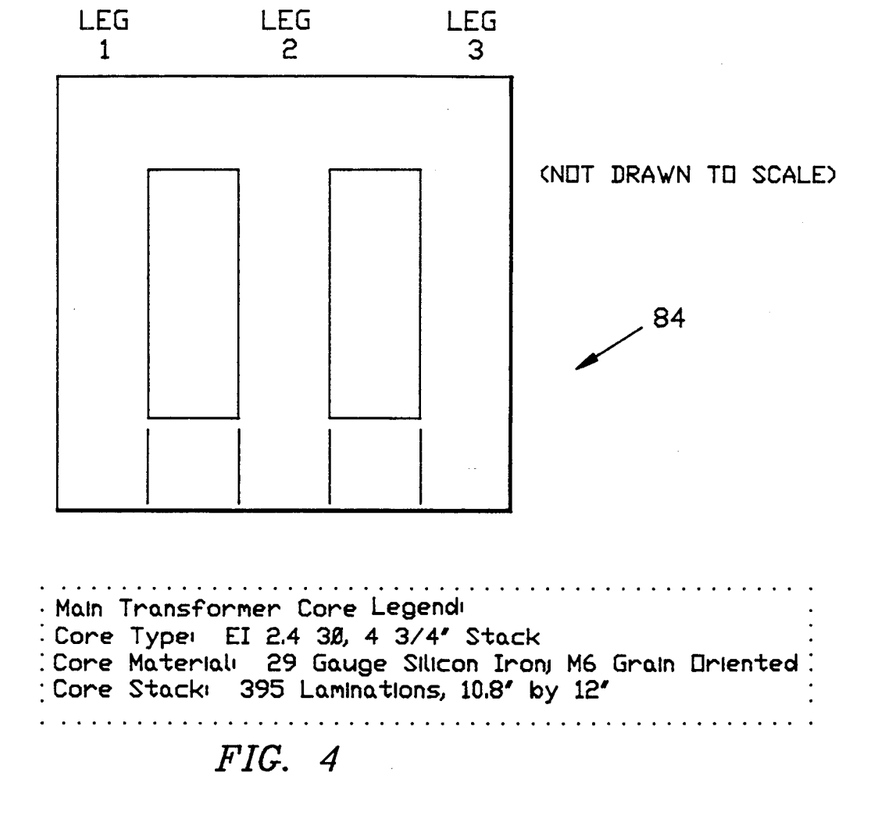
FIG. 4 illustrates construction criteria of a three-leg main transformer according to a representative embodiment of the invention.

Turning now to the details of the construction of this invention, in FIG. 4 there is illustrated representative construction criteria of a three-leg main transformer 84 in accordance with the invention.

Figure 5:
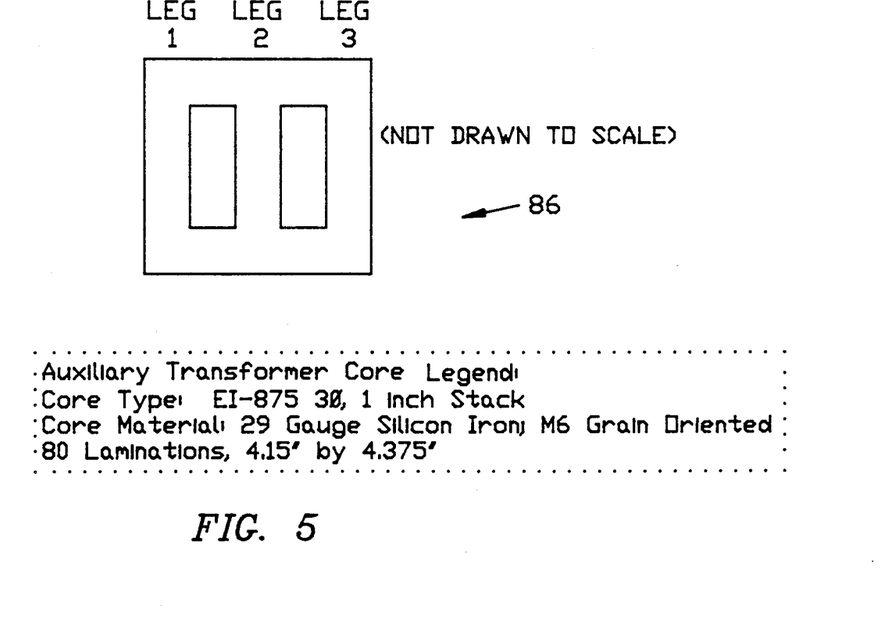
FIG. 5 shows construction specifications for an auxiliary three-leg transformer according to a representative embodiment of the invention.

In FIG. 5 there is illustrated a representative example of a three-leg auxiliary transformer 86 as may be utilized in the invention.

Referring FIGS. 1, 2, 4 and 5, for each input phase 70, 72 or 74 of the input waveforms applied to transformer 52, there is utilized a corresponding leg of main transformer 84 and leg of auxiliary transformer 86. As will be discussed, the main and auxiliary transformer couple is used to accurately adjust the voltage magnitude of the input phasors 70, 72 and 74 to produce adjusted output phasors that may be vectorially combined into the accurately constructed resulting output phasors ph1 through ph19 of FIG. 3.

Figure 6:
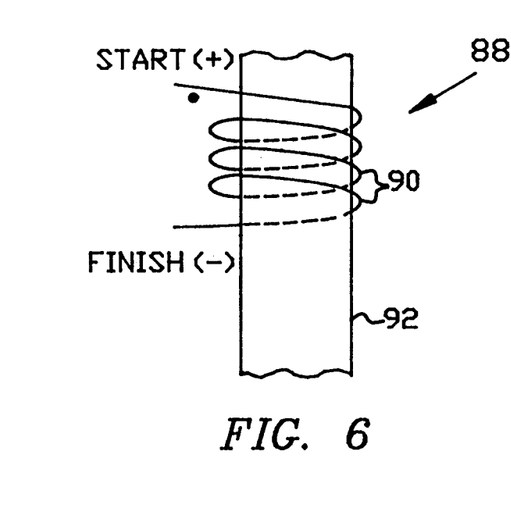
FIG. 6 provides winding descriptors as may be utilized with the invention.

Referring now to FIG. 6 there is shown winding nomenclature as will be used in discussion of construction of the invention. Shown in FIG. 6 is a winding 88 having a number of turns 90 disposed around a transformer leg 92. In accordance with standard transformer manufacturing techniques, windings placed around transformer legs, one winding shown in FIG. 6, encircle the legs all in the same direction regardless of the number of windings per leg. The beginning of this winding is commonly labeled as a "start" endpoint with the ending of the winding being labeled as a "finish" endpoint. Also in accordance with standard manufacturing techniques the convention utilized with this winding designates the start endpoint of the winding as positive with the finish of the winding being negative.

In Table 1, there are shown winding data as is utilized with main transformer 84 of FIG. 4. In this table, lead identification points A, B and C correspond to the input points A, B and C of FIG. 1. Further, lead identification points 1 through 19 correspond to connection points 1 through 19 shown in FIGS. 1 and 2.

TABLE 1

Main Transformer Design (Windings)

| WINDING LEAD IDENTIFICATION | | PHASOR DIREC. | WIRE SIZE AWG # | NUMBER OF TURNS | WINDING LOCATION (LEG) |
|---|---|---|---|---|---|
| START (+) | FINISH (−) | | | | |
| A | B | A-B | 12 SQ | 218 | 1 |
| B | C | B-C | 12 SQ | 218 | 2 |
| C | A | C-A | 12 SQ | 218 | 3 |
| SHIELD | | | | | |
| 1 | * | A-B | 6 SQ | 2 | 1 |
| 2 | D | C-B | 6 SQ | 8 | 2 |
| 2 | E | A-B | 6 SQ | 5 | 1 |
| 3 | F | C-B | 6 SQ | 5 | 2 |
| 3 | G | A-B | 6 SQ | 8 | 1 |
| 4 | J | C-B | 6 SQ | 2 | 2 |
| K | 4 | A-C | 6 SQ | 1 | 3 |
| M | 5 | A-B | 6 SQ | 8 | 1 |
| N | 5 | A-C | 6 SQ | 4 | 3 |
| Z | 6 | A-B | 6 SQ | 6 | 1 |
| P | 6 | A-C | 6 SQ | 7 | 3 |
| R | 7 | A-B | 6 SQ | 3 | 1 |
| 8 | T | A-C | 6 SQ | 9 | 3 |
| 8 | U | B-C | 6 SQ | 4 | 2 |
| 9 | V | A-C | 6 SQ | 6 | 3 |
| 9 | W | B-C | 6 SQ | 7 | 2 |
| 10 | X | A-C | 6 SQ | 3 | 3 |
| 10 | 11 | B-C | 6 SQ | 9 | 2 |
| IX | 11 | B-A | 6 SQ | 3 | 1 |
| IW | 12 | B-C | 6 SQ | 7 | 2 |
| IV | 12 | B-A | 6 SQ | 6 | 1 |
| IU | 13 | B-C | 6 SQ | 4 | 2 |
| IT | 13 | B-A | 6 SQ | 9 | 1 |
| 14 | IR | C-A | 6 SQ | 3 | 3 |
| 15 | IP | B-A | 6 SQ | 7 | 1 |
| 15 | IZ | C-A | 6 SQ | 6 | 3 |
| 16 | IN | B-A | 6 SQ | 4 | 1 |
| 16 | IM | C-A | 6 SQ | 8 | 3 |
| 17 | IK | B-A | 6 SQ | 1 | 1 |
| IJ | 17 | C-B | 6 SQ | 2 | 2 |
| IG | 18 | C-A | 6 SQ | 8 | 3 |
| IF | 18 | C-B | 6 SQ | 5 | 2 |
| IE | 19 | C-A | 6 SQ | 5 | 3 |
| ID | 19 | C-B | 6 SQ | 8 | 2 |

TABLE 1-continued

Main Transformer Design (Windings)

| WINDING LEAD IDENTIFICATION | | PHASOR DIREC. | WIRE SIZE AWG # | NUMBER OF TURNS | WINDING LOCATION (LEG) |
|---|---|---|---|---|---|
| START (+) | FINISH (−) | | | | |
| I* | 1 | C-A | 6 SQ | 2 | 3 |

In Table 1 the first three rows correspond to primary windings around first, second and third legs of main transformer 84 of the invention. These windings are separated by a shield with the remaining rows of the table corresponding to secondary windings on first, second and third legs of the main transformer. The first two columns of the table identify the start and finish endpoints of each winding, the convention of these endpoints being in correspondence with those shown in FIG. 6. The columns identified as phasor direction indicate the direction of the desired constructed phasor in relation to the input waveforms input phases 70, 72 and 74 illustrated in FIG. 2. The last three columns of this table include, respectively, wire size, number of turns per winding, and winding leg location.

Table 2 includes winding data as is utilized with auxiliary transformer 86 of FIG. 5. Like in Table 1, lead identification points A, B and C correspond to the input points A, B and C of FIG. 1 and lead identification points 1 through 19 correspond to connection points 1 through 19 shown in FIGS. 1 and 2.

In both Tables 1 and 2, windings with the same lead identification number are connected together.

TABLE 2

Auxiliary Transformer Design (Windings)

| WINDING LEAD IDENTIFICATION | | PHASOR DIREC. | WIRE SIZE AWG # | NUMBER OF TURNS | WINDING LOCATION (LEG) |
|---|---|---|---|---|---|
| START (+) | FINISH (−) | | | | |
| IT | 13 | A-B | 16 | 88 | 1 |
| 10 | 11 | B-C | 16 | 88 | 2 |
| 8 | T | C-A | 16 | 88 | 3 |
| D | * | B-A | 10 SQ | −3 | 1 |
| F | E | C-B | 10 SQ | 5 | 2 |
| H | G | B-A | 10 SQ | −3 | 1 |
| J | H | C-B | 10 SQ | 3 | 2 |
| L | K | A-C | 10 SQ | 2 | 3 |
| L | M | A-B | 10 SQ | 5 | 1 |
| Z | N | A-C | 10 SQ | 5 | 3 |
| P | Q | A-C | 10 SQ | 3 | 3 |
| R | Q | B-A | 10 SQ | −2 | 1 |
| 7 | S | B-C | 10 SQ | 6 | 2 |
| S | T | C-A | 10 SQ | −2 | 3 |
| V | U | A-C | 10 SQ | 4 | 3 |
| X | W | A-C | 10 SQ | 3 | 3 |
| IW | IX | B-A | 10 SQ | 3 | 1 |
| IU | IV | B-A | 10 SQ | 4 | 1 |
| IT | IS | A-B | 10 SQ | −2 | 1 |
| IS | 14 | B-C | 10 SQ | 6 | 2 |
| IQ | IR | A-C | 10 SQ | −2 | 3 |
| IP | IQ | B-A | 10 SQ | 3 | 1 |
| IN | IZ | B-A | 10 SQ | 5 | 1 |
| IM | IL | C-A | 10 SQ | 5 | 3 |
| IK | IL | B-A | 10 SQ | 2 | 1 |
| IH | IJ | C-B | 10 SQ | 3 | 2 |
| IG | IH | A-C | 10 SQ | −3 | 3 |
| IE | IF | C-B | 10 SQ | 5 | 2 |
| I* | ID | A-C | 10 SQ | −3 | 3 |

In Table 2, the first three rows represent primary windings on the first, second and third legs of the auxiliary transformer illustrated in FIG. 5. Rows beneath these first three windings represent secondary windings on the indicated legs of this transformer.

Figure 7:
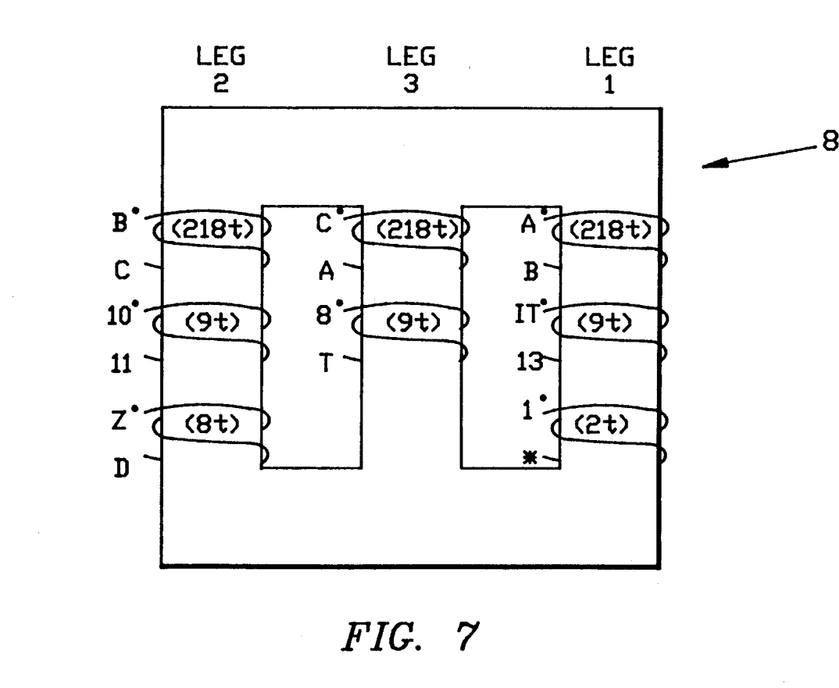
FIG. 7 is a front view of a main transformer of a representative model of the invention illustrating some of the windings that may be used with such transformer.
Figure 8:
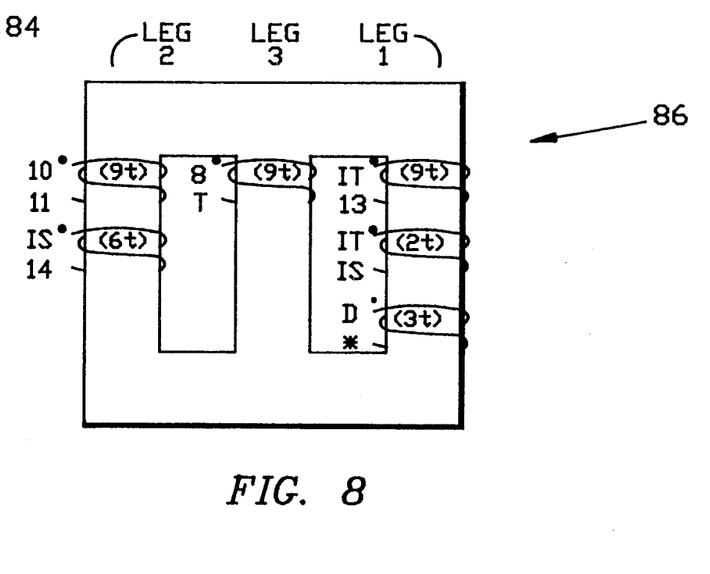
FIG. 8 corresponds to FIG. 7 in which an auxiliary transformer of a representative embodiment of the invention is shown with some of the windings that may be used with such transformer.

Referring now to FIGS. 7 and 8 there are shown some of the windings as are utilized with main transformer 84 and auxiliary transformer 86 of the invention. In this representative design of the invention one turn of the secondary windings of auxiliary transformer 86 provides one tenth of the voltage of a single turn of the secondary windings of main transformer 84. By utilizing both main and auxiliary transformers it is possible to construct resulting phasor voltages such as phasors ph1 through ph 19 of FIG. 2, that are very close to the same magnitude and relative phase angle regardless of the number of transformer output phases. The smaller voltage contribution of the auxiliary transformer allows greater accuracy in constructing phasor voltages such as those along ring 78 or FIG. 2.

To further illustrate the construction of the invention reference should be made to Tables 1, 2 and FIGS. 7 and 8. First, examining the primary windings of main transformer 84, it can be seen that for connection points A and B, also shown in FIG. 1, a winding of 208 turns is made around leg 1 of main transformer 84. Energization of this winding results in a phasor direction corresponding to that of going from point A to B of input phasor diagram 69 of FIG. 2. In like manner, primary winding B-C is provided around leg 2 of main transformer 84 culminating in 218 turns with a phasor direction of B-C corresponding to input phasor 72 of FIG. 2. Similarly, winding C-A is turned around leg 3 of main transformer 84 to provide a phasor of the C to A direction of input phasor 74 of FIG. 2.

In order to provide economy of transformer windings auxiliary transformer 86 has primary windings energized from secondary windings of main transformer 84. Referring to Table 1 it can be seen in a secondary winding of the table that winding IT-13 includes nine turns of leg 1 of main transformer 84. Referring to Table 2 it can be seen that a primary winding of auxiliary transformer 86 includes a winding having the same start and ending points, IT-13, as the previously described secondary of main transformer 84. The parallel connection of these windings provides energization of leg 1 of auxiliary transformer 86 by way of secondary winding IT-13 of main transformer 84. In like manner secondary 10-11 of main transformer 84 is coupled in parallel to primary winding 10-11 of auxiliary transformer 86 to supply energization to leg 2 of transformer 86. Also, secondary windings 8-T of main transformer 84 energizes leg 3 of auxiliary transformer 86 by a parallel connection to primary winding 8-T of auxiliary transformer 86.

Referring again to FIG. 2, as those skilled in the transformer art will know, the degree of adjustment of input phases necessary to produce desired resulting output phases can be determined through a literal measurement of the output phasors necessary to construct a desired resulting phasor. For example, once the magnitude of the input phasors and the desired resulting output phasors has been determined, these may be plotted in any arbitrary units providing that the units are the same among the input phasors and the resultant output phasors.

Referring to FIG. 2 if an input phasor such as 70, 72 and 74 has been designated as being of a length of 75 units and a desired resultant output phasor such as ph1, ph2, etc., has 25 units, the precise magnitude of the adjusted output phasors necessary to construct the resultant output phasors can be determined.

For example, phasor ph13 can be constructed by one or more transformer output phasors equalling 24.66 units in the B-A direction adjusted from parallel input phasor 70. Point 14 of ring 78 may then be intersected by an output phasor in the B-C direction of 1.62 units adjusted from input phasor 72. Of course it would be possible to select a phasor path outside of ring 78, however this would require more windings than an inside path and hence would be a less economical approach.

Figure 9:
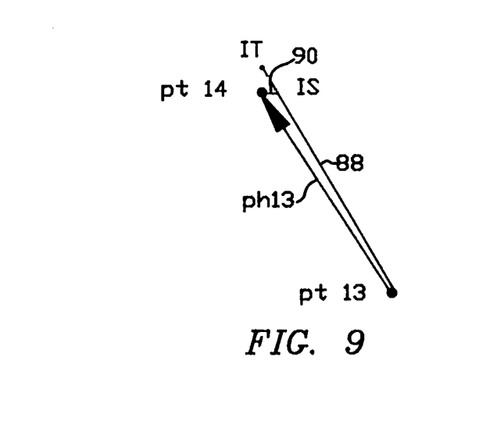
FIG. 9 is a partial detailed view of FIG. 2 illustrating phasor construction between construction points 13 and 14 of FIG. 1.

In FIG. 9 a detailed view of the construction of phasor 13 is shown. Referring now to Tables 1 and 2 as well as FIGS. 2, 7-9, greater details of the construction of phasor 13 will be disclosed. As discussed, phasor construction paths within ring 78 of FIG. 2 provide a more economical winding approach compared to paths outside of circle 78. With such constraints in mind a resultant phasor from point 13 to point 14 may be most economically constructed by transformer adjustment of incoming phasor 70 to provide one or more output phasors resulting in a B-A direction phasor of 24.66 units.

Referring to Table 1 it can be seen that winding IT-13 provides an adjusted output phasor from main transformer 84 in the B-A direction. The nine-turn (9t) of secondary winding IT-13 on leg 1 of main transformer 84 actually provides an adjusted output phasor that overshoots or is greater in magnitude than intended transformer output phasor 88. In traditional transforming approaches this overshoot could be at least partially corrected by a plus or minus one turn on an applicable transformer leg. Substraction or addition of this one turn may still not result in a transformer output phasor of accurate voltage magnitude.

In accordance with the invention auxiliary transformer 86 is employed to fine tune the voltage magnitude of phasor 88 to bring it to its intended magnitude. The start or positive endpoint of secondary winding IT-13 of main transformer 84 leg 1 is connected to the start of a secondary winding IT-IS wound on leg 1 of auxiliary transformer 86 and shown to be of an A-B direction. By connecting the two starts of these windings, winding IT-IS of auxiliary transformer 86 "bucks" the magnitude of output phasor 88 to a desired length.

A path from interconnect point IS to point 14 is parallel to input phasor 72 and is of a B-C direction. Input phasor 72 is adjusted by six-turn winding IS 14 on leg 2 of auxiliary transformer 86. The adjusted output phasor 90 vectorially combined with adjusted output phasor 88 results in resultant output phasor (ph13) accurately constructed in both voltage magnitude and phasor angle.

Figure 10:
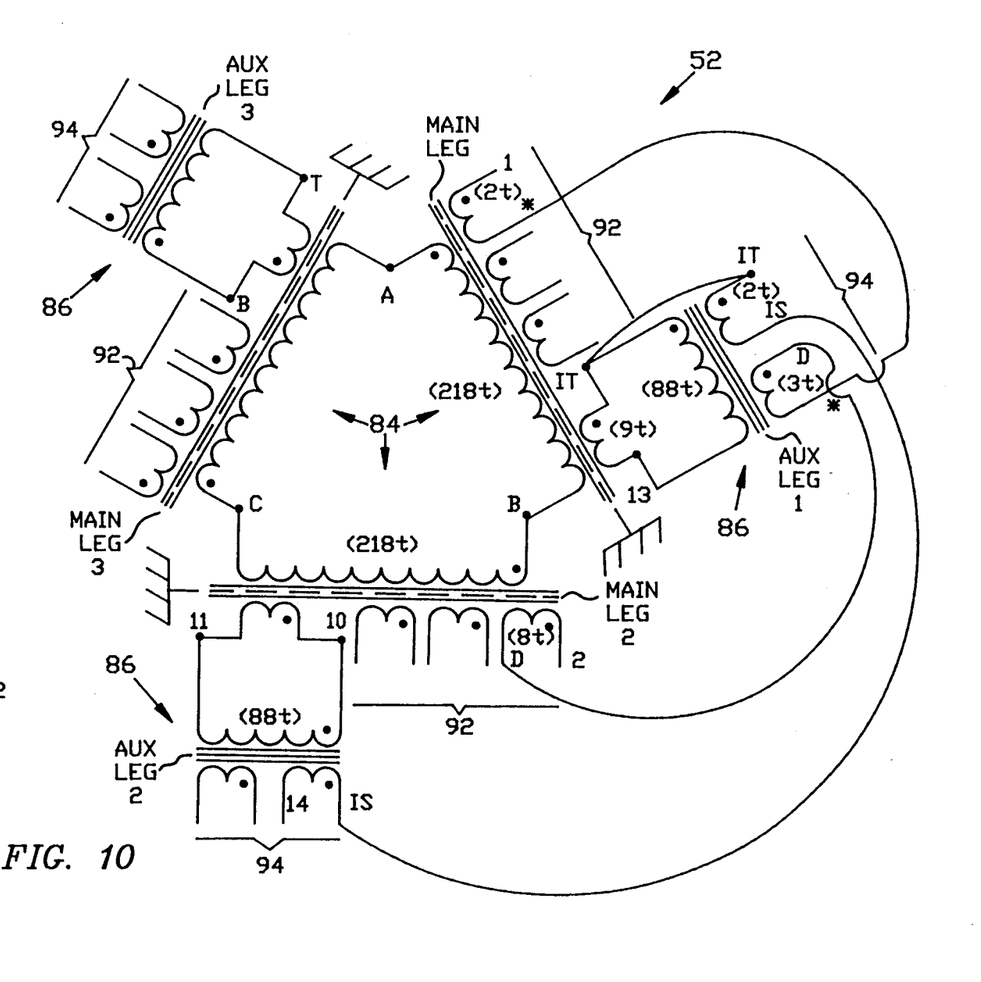
FIG. 10 is a partial view of a diagrammatic electrical schematic according to a representative embodiment of the invention.
Figure 11:
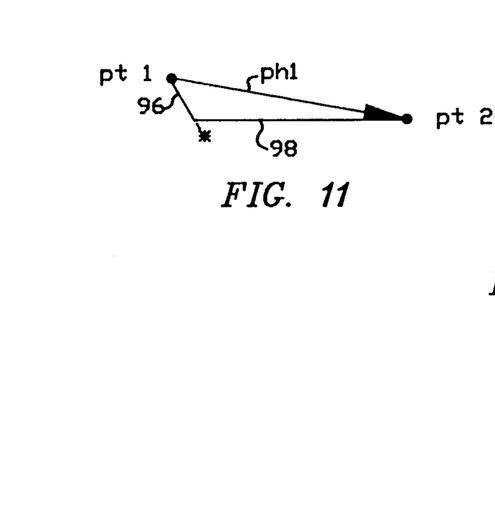
FIG. 11 is another partial detailed view of FIG. 2 depicting phasor construction between points 1 and 2 of FIG. 2.

In FIG. 10 a partial schematic view of transformer 52 is shown in which some of the main transformer 84 secondaries 92 as well as some of the auxiliary transformer 86 secondaries 94 are shown. To illustrate the connections necessary to construct resultant output phasor ph13 shown in FIGS. 2 and 9, reference once again must be made to Tables 1 and 2 as well FIGS. 7 and 8.

Secondary winding IT-13 disposed around leg 1 of main transformer 84 is connected in parallel with a winding of the same designation wound around auxiliary transformer 86 leg 1. To construct adjusted output phasor 88 of FIG. 9 a phasor in the B-A direction is necessary. Winding IT-13 disposed around main transformer leg 1 provides an adjusted output phasor to point IT of FIG. 9. To "return" this adjusted output phasor to the desired length of phasor 88, a connection is made between the start terminals of IT-13 and IT-IS, resulting in bucking adjusted output phasor 88 to its intended voltage magnitude. Adjusted output phasor 90 is then constructed in the B-C direction by adjusting input phasor 72 with six turns of secondary winding IS-14 disposed around leg 2 of auxiliary transformer 86.

As an additional example, the construction of resultant phasor 1 will be explained. Referring to Tables 1 and 2 and FIGS. 2, 7, 8, 10 and 11, again in order to conserve transformer windings a phasor construction path within ring 78 of FIG. 2 is taken. In Table 1 it can be seen that secondary winding 1-* of two turns around leg 1 of main transformer 84 provides an adjusted output phasor from input phasor 70 that is in the A-B direction. This A-B directed adjusted output phasor overshoots the voltage magnitude of the intended phasor 96 necessary to accurately construct resultant phasor 1. To construct an adjusted phasor that meets the intended voltage magnitude of phasor 96, three bucking turns are made on secondary winding D-* of auxiliary transformer 86 about leg 1 of this transformer. The bucking turns are created by electrically coupling the finish endpoint of main transformer secondary winding 1-* to the finish endpoint of auxiliary transformer secondary winding D-*. The buck is in the B-A direction and adjusts output vector 96 to its intended voltage magnitude. Connections for adjusted output phasor 96 can be seen in FIG. 10 as well as FIGS. 7 and 8. Adjusted output phasor 98 is then constructed by adjusting the magnitude of input phasor 72. Phasor 98 should be in the C-B direction and is made by main transformer secondary winding 2-D of 8 turns around leg 2 of the transformer, as shown in FIGS. 7 and 10. Resultant output phasor 1 is then accurately constructed by the vectorial addition of adjusted output phasor 96 and adjusted output phasor 98.

As can be seen, the utilization of main and auxiliary transformers permits one to construct output phasors of accurate voltage magnitude and phase angle. A polyphase transformer incorporating such a design may substantially lessen voltage ripple generated by power supplies as well as current harmonics created by nonlinear loads applied to the transformer.

A transformer of such construction is particularly suitable in those applications where three-phase input waveforms are divided into output waveforms having a number of output phases that are not evenly divisible by three. Of course the specific construction of the invention offered in this description has been set forth for the purpose of enabling one skilled in the art to make and use the invention. However, those skilled in the art will realize that many variations and modifications of this invention are possible in light of the above teaching.

It is therefore to be understood that within the scope of the appended claims the invention may be practiced otherwise than as has been specifically described.

What is claimed is:

1. A transformer system comprising:
    a main transformer having at least one leg with said leg having a primary main winding and a plurality of secondary main winding therearound, one turn of said secondary main windings inducing one step of voltage change to a waveform passed through said at least one of said legs of said main transformer; and an auxiliary transformer having at least one leg with a primary auxiliary winding therearound, said primary auxiliary winding being operatively coupled in series with one of said secondary main windings with said at least one leg of said auxiliary transformer also having a plurality of secondary auxiliary windings therearound, one turn of said secondary auxiliary windings inducing a fraction of said one step of voltage change to a waveform passed through said at least one of said legs of said auxiliary transformer.

2. A transformer system according to claim 1 in which:

one leg of said main transformer and one leg of said auxiliary transformer provide a transformer couple with one of said transformer couples being operatively coupled to receive a single input phase of a polyphase waveform so that each input phase of said polyphase waveform has an individual transformer couple, and in which said input phases are each describable by a phasor having voltage and direction with said transformer couples for adjusting the voltages of said phasors to provide adjusted output phasors each of selected voltage and of direction corresponding to the direction of the phasor received by said individual transformer couple.

3. A transformer system according to claim 2 further including:

electrical connections operably disposed between said transformer couples so that said adjusted output phasors corresponding to each of said input phases may be vectorially added to provide resultant output phasors of selected voltage and of selected direction.

4. A transformer system according to claim 3 further including a rectifier circuit operably coupled to receive said resultant output phasors for rectifying said resultant output phasors.

5. A method for transforming a plurality of input phases each having a voltage and direction comprising the steps of:

passing each of said input phases through a main transformer individual to said input phases to selectively adjust the voltage of said input phases by increments each equal to a step of preselected voltage change to provide step voltage-adjusted output phases corresponding to the direction of the input phase passing through said main transformer;

passing each of said step voltage-adjusted output phases through an auxiliary transformer individual to said step voltage-adjusted output phases to selectively adjust the voltage of said step voltage-adjusted output phases by increments each equal to a fraction of said step of preselected voltage change to provide fraction-step voltage-adjusted output phases corresponding to the direction of the step voltage-adjusted output phase passing through said auxiliary transformer; and vectorially combining said step voltage-adjusted output phases and said fraction-step voltage-adjusted output phases of said main and auxiliary transformers to provide resultant output phases of predetermined voltage and direction.

6. A method as described in claim 5 including the additional step of rectifying said resultant output phases.

7. An apparatus comprising:

first main transformer means for transforming a first input phase passed through it, said first input phase being describable by a first phasor of magnitude and direction, said first main transformer means for altering the magnitude of the first phasor passed through it by at least one step of preselected change to produce a first step adjusted output phasor corresponding in direction to said first phasor;

first auxiliary transformer means being electrically coupled in series to said first main transformer means, said first auxiliary transformer means for altering the magnitude of said first step adjusted output phasor passed through it by at least a fraction of said one step of preselected change to produce a first fractional step adjusted output phasor corresponding in direction to said first phasor;

second main transformer means for transforming a second input phase passed through it, said second input phase being describable by a second phasor of magnitude and direction, said second main transformer means for altering the magnitude of the second phasor passed through it by at least one step of preselected change to produce a second step adjusted output phasor corresponding in direction to said second phasor;

second auxiliary transformer means being electrically coupled in series to said second main transformer means, said second auxiliary transformer means for altering the magnitude of said second step adjusted output phasor passed through it by at least a fraction of said one step of preselected change to produce a second fractional step adjusted output phasor corresponding in direction to said second phasor;

means for interconnecting said first and second main and auxiliary transformer means to selectively combine said first and second step adjusted output phasor and said first and second fractional step adjusted output phasors into output phasors of predetermined magnitude and of predetermined direction.

8. The apparatus of claim 7 in which said magnitude is voltage.

9. An apparatus comprising:

a main transformer having a plurality of main leg means each of which are for transforming an input phase passed through it, each input phase being describable by a phasor of magnitude and direction, said main leg means for altering the magnitude of the phasor passed through it by at least one step of preselected change to produce a step adjusted output phasor corresponding in direction to the phasor altered;

an auxiliary transformer having a plurality of auxiliary leg means, each of said auxiliary leg means being individual to each of said main leg means and being electrically coupled in series thereto, said auxiliary leg means for altering the magnitude of said step adjusted output phasor passed through it by at least a fraction of said one step of preselected change to produce a fractional step adjusted output phasor corresponding in direction to the step adjusted output phasor altered; and means for interconnecting said main leg means and said auxiliary leg means to selectively combine said step adjusted output phasors and said fractional step adjusted output phasors into output phasors of predetermined magnitude and of predetermined direction.

10. The apparatus of claim 9 in which said magnitude is voltage.

* * * * *